United States Patent
Cui et al.

(10) Patent No.: US 11,487,589 B2
(45) Date of Patent: Nov. 1, 2022

(54) SELF-ADAPTIVE BATCH DATASET PARTITIONING FOR DISTRIBUTED DEEP LEARNING USING HYBRID SET OF ACCELERATORS

(71) Applicant: EMC IP Holding Company LLC, Hopkinton, MA (US)

(72) Inventors: Wei Cui, Beijing (CN); Sanping Li, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1061 days.

(21) Appl. No.: 16/133,054

(22) Filed: Sep. 17, 2018

(65) Prior Publication Data

US 2020/0042362 A1    Feb. 6, 2020

(30) Foreign Application Priority Data

Aug. 3, 2018    (CN) .......................... 201810878224.0

(51) Int. Cl.
| | | |
|---|---|---|
| G06E 1/00 | (2006.01) | |
| G06F 9/50 | (2006.01) | |
| G06N 3/08 | (2006.01) | |
| G06T 1/20 | (2006.01) | |
| G06K 9/62 | (2022.01) | |

(Continued)

(52) U.S. Cl.
CPC ............ *G06F 9/5077* (2013.01); *G06F 9/505* (2013.01); *G06F 17/18* (2013.01); *G06K 9/6256* (2013.01); *G06N 3/084* (2013.01); *G06T 1/20* (2013.01); *H04L 67/1008* (2013.01)

(58) Field of Classification Search
CPC ........ G06F 9/5077; G06F 9/505; G06F 17/18; G06K 9/6256; G06N 3/084; G06T 1/20; H04L 67/1008
See application file for complete search history.

(56) References Cited

U.S. PATENT DOCUMENTS

| | | | |
|---|---|---|---|
| 6,269,351 B1 * | 7/2001 | Black ..................... | G06N 3/082 706/14 |
| 6,888,831 B1 | 5/2005 | Hospodor et al. | |
| 8,938,416 B1 | 1/2015 | Cole et al. | |

(Continued)

OTHER PUBLICATIONS

Minsoo Rhu et al., "vDNN: Virtualized Deep Neural Networks for Scalable, Memory-Efficient Neural Network Design," 49th IEEE/ACM International Symposium on Microarchitecture (Micro-49), 2016, 13 pages.

(Continued)

*Primary Examiner* — Wissam Rashid
(74) *Attorney, Agent, or Firm* — Ryan, Mason & Lewis, LLP

(57) ABSTRACT

Systems and methods are provided for implementing a self-adaptive batch dataset partitioning control process which is utilized in conjunction with a distributed deep learning model training process to optimize load balancing among a set of accelerator resources. An iterative batch size tuning process is configured to determine an optimal job partition ratio for partitioning mini-batch datasets into sub-batch datasets for processing by a set of hybrid accelerator resources, wherein the sub-batch datasets are partitioned into optimal batch sizes for processing by respective accelerator resources to minimize a time for completing the deep learning model training process.

23 Claims, 6 Drawing Sheets

(51) Int. Cl.
*G06F 17/18* (2006.01)
*H04L 67/1008* (2022.01)

(56) References Cited

U.S. PATENT DOCUMENTS

| | | | |
|---|---|---|---|
| 9,836,354 | B1 | 12/2017 | Potlapally et al. |
| 9,984,648 | B2 | 5/2018 | Chakraborty et al. |
| 2008/0195843 | A1 | 8/2008 | Muniandy |
| 2009/0089560 | A1 | 4/2009 | Liu et al. |
| 2011/0131430 | A1 | 6/2011 | Krishnamurthy et al. |
| 2012/0011401 | A1 | 1/2012 | Ranganathan et al. |
| 2014/0198112 | A1 | 7/2014 | Miyamoto et al. |
| 2014/0325073 | A1 | 10/2014 | Urbach |
| 2015/0213163 | A1 | 7/2015 | Yang et al. |
| 2015/0271331 | A1 | 9/2015 | Segre et al. |
| 2015/0317192 | A1 | 11/2015 | Munshi et al. |
| 2016/0247248 | A1 | 8/2016 | Ha et al. |
| 2017/0220949 | A1 | 8/2017 | Feng et al. |
| 2017/0293758 | A1 | 10/2017 | Saxena et al. |
| 2017/0353397 | A1 | 12/2017 | Che |
| 2018/0075347 | A1 | 3/2018 | Alistarh et al. |

OTHER PUBLICATIONS

Tensorflow, "Tensor/Tensorflow," https://github.com/tensorflow/tensorflow/blob/master/tensorflow/python/training/saver.py, 2015, 32 pages.

S. Han et al., "Deep Compression: Compressing Deep Neural Networks with Pruning, Trained Quantization and Huffman Coding," arXiv:1510.00149v5, Published as a conference paper at International Conference on Learning Representations (ICLR), Feb. 16, 2016, 14 pages.

Tony Paikeday, "Seven Service Providers Delivering the GPU-Accelerated Cloud—Built on Nvidia Grid," https://blogs.nvidia.com/blog/2016/09/27/the-gpu-accelerated-cloud/, Sep. 27, 2016, 4 pages.

amazon.com, "Linux Accelerated Computing Instances," http://docs.aws.amazon.com/AWSEC2/latest/UserGuide/using_cluster_computing.html, 9 pages.

Tiffany Trader, "Microsoft Puts GPU Boosters on Azure Cloud," https://www.hpcwire.com/2016/09/29/microsoft-puts-gpu-boosters-on-azure-cloud/, Sep. 29, 2015, 3 pages.

* cited by examiner

SELF-ADAPTIVE BATCH DATASET PARTITIONING FOR DISTRIBUTED DEEP LEARNING USING HYBRID SET OF ACCELERATORS

FIELD

This disclosure relates generally to techniques for accelerated data processing in a high-performance computing environment.

BACKGROUND

Various types of special-purpose processors, such as graphics processing units (GPUs) for general purpose computing and other types of hardware accelerators, have been developed for accelerated processing of specific types of workloads. The processing capabilities of GPU devices and other types of hardware accelerators are currently being utilized in various applications to accelerate the processing of highly-parallelized computational workloads in various technical fields. In particular, general-purpose computing on GPU (GPGPU) is utilized for high-throughput, accelerated processing of compute kernels for workloads (e.g., vector-based computations, matrix-based computations, etc.) that exhibit data-parallelism. For example, GPUs are used to accelerate data processing in high-performance computing (HPC) and embedded computing systems, for various applications such as financial modeling, scientific research, machine learning (ML), deep learning (DL), data mining, video data transcoding, image analysis, image recognition, virus pattern matching, augmented reality, encryption/decryption, weather forecasting, big data analytics and comparisons, and other applications with computational workloads that have an inherently parallel nature.

A distributed computing environment which comprises a large scale of shared computing resources over a cluster of computing nodes is typically utilized to support emerging applications such as big data analytics and DL applications. For example, DL applications require the collection, storage, and processing of a significantly large amount of data, wherein the data includes training data to build and optimize deep learning models, as well as model parameters of deep learning models which are utilized for inference processing. Currently, there are various service providers which provide infrastructure as a service (IaaS), platform as a service (PaaS) and/or GPU-as-a-Service (GPUaaS) on cloud-based systems, which allow customers to execute various applications such as deep learning applications using various cloud based resources such as GPUs and other accelerator resources.

Due to continuing advances in GPU and accelerator technologies, many service providers have multiple generations of accelerator devices (e.g., GPUs) that co-exist in their cloud-based infrastructures, resulting in a hybrid set of accelerator resources with varying levels of performance. While distributed computing applications such as DL model training can be implemented using a set of hybrid accelerator resources (e.g., a set of GPUs resources comprising different types of GPU devices), the provisioning and use of hybrid resources for executing a given task can be problematic. For example, distributed DL model training is typically performed by partitioning jobs (e.g., dividing a training dataset) evenly among a set of GPU resources for data-parallel processing. However, when the set of GPU resources comprise GPU devices with different performances (e.g., processing speeds), the slower performance GPU resources will create a bottleneck in the data-parallel processing and essentially slow down the training process, which leads to inefficient resource utilization.

SUMMARY

Illustrative embodiments of the invention include self-adaptive batch dataset partitioning control methods which are implemented as part of a distributed deep learning model training process to optimize load balancing among a set of accelerator resources. For example, a method includes provisioning a plurality of accelerator resources on one or more server nodes of a computing system to execute a distributed deep learning model training process to train a deep learning model. A training dataset is partitioned into a plurality of mini-batch datasets. An initial mini-batch dataset is partitioned into a plurality of sub-batch datasets according to an initial default job partition ratio. An initial mini-batch iteration of the distributed deep learning model training process is performed by each of the accelerator resources processing a corresponding one of the sub-batch datasets of the initial mini-batch dataset. An iterative batch size tuning process is performed to iteratively adjust a job partition ratio for subsequent mini-batch iterations of the distributed deep learning model training process. The iterative batch size tuning process comprises: determining a job completion time for each of the accelerator resources to complete processing of the corresponding one of the sub-batch datasets of the initial mini-batch dataset; determining a standard deviation of the job completion times of the accelerator resources as a result of the initial default job partition ratio for the initial mini-batch iteration; comparing the determined standard deviation to a predetermined standard deviation threshold value; and responsive to the determined standard deviation of the job completion times exceeding the predetermined standard deviation threshold, adjusting the job partition ratio for partitioning a next mini-batch dataset into a plurality of sub-batch datasets for a next mini-batch iteration of the distributed deep learning model training process.

Other embodiments of the invention include, without limitation, systems and articles of manufacture comprising processor-readable storage media, which are configured to implement self-adaptive batch dataset partitioning control methods as part of a distributed deep learning model training process to optimize load balancing among a set of accelerator resources.

DETAILED DESCRIPTION

Figure 1:
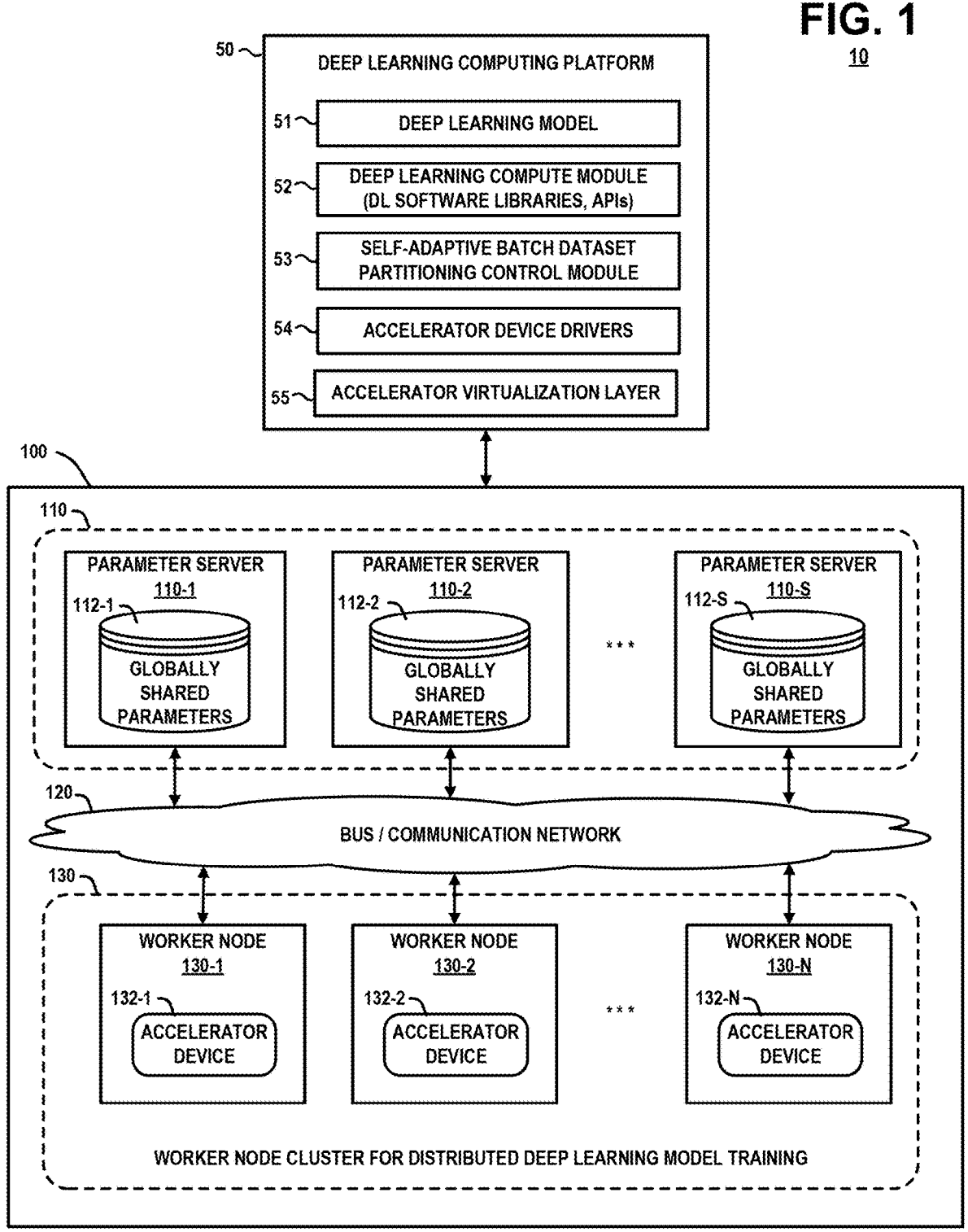
FIG. 1 schematically illustrates a computing system comprising a deep learning computing platform, which implements a self-adaptive batch dataset partitioning control method to optimize load balancing among a set of accelerator resources for a distributed deep learning model training task, according to an embodiment of the invention.

Illustrative embodiments of the invention will now be explained in further detail with regard to systems and methods for implementing a self-adaptive batch dataset partitioning control process which is utilized in conjunction with a distributed deep learning model training process to optimize load balancing among a set of accelerator resources. As explained in further detail below, embodiments of the invention include systems and methods for implementing an iterative batch size tuning process which is configured to determine an optimal job partition ratio for partitioning mini-batch datasets into sub-batch datasets for processing by a set of hybrid accelerator resources, wherein the sub-batch datasets are partitioned into optimal batch sizes for processing by respective accelerator resources to minimize a time for completing the deep learning model training process.

While the exemplary embodiments discussed herein can be implemented for various HPC applications in which parameter server systems are utilized to synchronize application state, for illustrative purposes, embodiments of the invention will be discussed in the context of performing DL model training for Deep Neural Network (DNN) applications in a distributed computing environment. A distributed DL model training process requires a significant use of computing resources (e.g., processor, memory, storage, and networking resources), and the communication of large amounts of data over internal system busses and/or inter-node network communication links. As explained in further detail below, the incorporation of parameter server logic within networking infrastructure elements enhances communication performance (e.g. reduces communication latency) for performing parameter synchronization operations for a cluster of accelerator devices (e.g., GPU devices) performing a distributed, data parallel DL model training task.

A DL model is typically utilized in machine learning applications for pattern recognition, image processing, and other artificial intelligence applications. A DL application can utilize a DNN, wherein a DNN comprises a feedforward artificial neural network with multiple hidden layers. A convolutional neural network (CNN) is one class of DNN which is commonly applied for analyzing images. A CNN comprises a sequence of functional layers including an input layer, an output layer, and a plurality of hidden layers between the input and output layers. The functional layers include, but are not limited to, convolutional layers, pooling layers, fully connected layers, normalization layers, etc. A convolutional layer applies a "convolution operation" to an input dataset, and passes the processing results to the next layer in the network. As is known in the art, a convolutional layer applies filters (alternatively referred to as neurons or kernels) across all regions of an input dataset, wherein each filter is spatially smaller than the full volume of the input data set. The filters of a convolutional layer each comprise a set of learnable parameters (or weights), which are learned using a DL model training process. A convolutional layer utilizes a set of filters to perform a forward pass through an input dataset, wherein each filter slides (or convolves) across the width and height of the input volume and computes dot products between the entries of the filter and the input data at any position (i.e., receptive field). In essence, the convolution layer computes an output of neurons which are connected to corresponding local regions in the input data.

A DL model can be trained using a stochastic gradient descent (SGD) training process. With SGD training, error gradient with respect to model parameters of a given DL model are calculated using multiple iterations of a backpropagation process. A backpropagation comprises a sequence of three cycles including (i) a forward process, (ii) a backward process, and (iii) a weight update process, wherein the backpropagation process is repeated for many iterations until a convergence criterion is met. A distributed SGD DL training process can be implemented in an HPC system using a data-parallel programming model in which the SGD training process is executed in parallel by a plurality of worker nodes executing worker processes (e.g., accelerator resources such as GPU resources) that are distributed over one or more compute nodes of the HPC system.

In data parallel training, for each iteration of a backpropagation process, a mini-batch of data samples is partitioned and evenly distributed to a plurality of worker nodes, which can reside on the same or different server machines. With data parallelism, each worker node has access to a complete copy of a current state of the DL model, but for each iteration, each worker node is only assigned a subset of the data samples of a current mini-batch for processing. For each iteration, each worker node executes kernel functions (via GPU devices) to perform a forward propagation of the DL network model using its respective subset of data samples, followed by an error backpropagation process to compute the gradient of the loss with respect to the DL model parameters. The worker nodes perform the forward and backward propagation operations on their respective subsets of a given mini-batch dataset in parallel. The gradient parameters computed by all worker nodes for the given iteration are then aggregated/synchronized (e.g. averaged) and the averaged gradient parameters are pushed to each worker node so that each worker node can perform a parameter update process using the averaged gradient parameters to update the model parameters of the DL network model. Various distributed system configurations can be implemented to aggregate/synchronize the model parameters, and push the averaged gradient parameters to each worker node to perform the distributed DL model training process. In one embodiment, a DL model training process can be implemented using a parameter server system to perform distributed and parallelized SGD training of a DL model using a cluster of accelerator devices (e.g., GPU devices).

FIG. 1 schematically illustrates a computing system comprising a deep learning computing platform, which implements a self-adaptive batch dataset partitioning control method to optimize load balancing among a set of accelerator resources for a distributed deep learning model training task, according to an embodiment of the invention. In particular, FIG. 1 schematically illustrates a computing system 10 (or HPC system 10) which is configured to perform distributed DL model training using a distributed parameter server system to synchronize and exchange model parameters between a cluster of worker nodes. The HPC system 10 comprises a deep learning computing platform 50 which comprises a deep learning model layer 51, a deep learning compute module 52, a self-adaptive batch dataset partitioning control module 53, an accelerator device driver layer 54, and an accelerator virtualization layer 55. The HPC system 10 further comprises a distributed computing system 100 which is configured to execute the various functions (e.g., distributed DL model training) of the deep learning computing platform 50.

The distributed computing system 100 comprises a parameter server system 110 comprising a plurality (S) of parameter server nodes 110-1, 110-2, . . . , 110-S (collectively, parameter servers 110), a bus/communication network 120, and a worker node cluster 130 comprising a plurality (N) of worker nodes 130-1, 130-2, . . . , 130-N (collectively, worker nodes 130). The parameter server nodes 110-1, 110-2, . . . , 110-S manage a respective set of globally shared model parameters 112-1, 112-2, . . . , 112-S. The worker nodes 130-1, 130-2, . . . , 130-N comprise respective accelerator devices 132-1, 132-2, . . . , 132-N (collectively, accelerator devices 132). The accelerator devices 132 can be implemented using any type of accelerator hardware devices such as GPUs, tensor processing units (TPUs), etc.

Each worker node 130-1, 130-2, . . . , 130-N within the cluster 130 manages a worker process which is executed by a respective accelerator device 132-1, 132-2, . . . , 132-N. A worker process can be implemented as a bare metal process, or a virtual process (e.g., a virtual machine, container application, etc.). While the parameter server system 110 can be implemented on a single compute node to store and manage all parameters of a DL model in the single node, FIG. 1 illustrates an example embodiment of the distributed computing system 100 in which the parameter server logic of the parameter server system 110 is distributed over the plurality of parameter server nodes 110-1, 110-2, . . . , 110-S, which communicate to perform model parameter processing and synchronization functions as described in further detail below. In some embodiments, the logic of the parameter server nodes 110-1, 110-2, . . . , 110-S is executed by host processors (e.g. CPUs). In other embodiments, the logic of the parameter server nodes 110-1, 110-2, . . . , 110-S is executed by the same accelerator devices 132-1, 132-2, . . . , 132-N which execute the worker processes of the worker nodes 130-1, 130-2, . . . , 130-N.

In some embodiments, the parameter server nodes 110 and the worker nodes 130 of the distributed system 100 are separate logical nodes which execute on the same physical node (e.g., server node). In other embodiments, the parameter server nodes 110 and the worker nodes 130 of the distributed system 100 are separate logical nodes which are distributed and executed across two or more different physical nodes (e.g., different server nodes). In this regard, the bus/communication network 120 comprises backbone networking infrastructure and communication protocols to implement one or more of various types of intra-node and/or inter-node connection topologies and communication protocols that are utilized to physically connect, and enable communication between, the hardware processor resources which execute the functions of the parameter server nodes 110 and the worker nodes 130.

For example, the intra-node connection topologies within a given physical server node can be implemented using various communication protocols such as a Remote Direct Memory Access (RDMA) protocols, an InfiniBand (TB) protocol, a Peripheral Component Interconnect Express (PCIe) protocol, a NVIDIA® NVLink™ protocol, NVIDIA GPUDirect, and other point-to-point serial interconnect protocols that enable, e.g., CPU-GPU and GPU-GPU communication. Furthermore, a given server node may implement the QuickPath Interconnect (QPI) protocol, which is a point-to-point processor interconnect framework that enables a Non-Uniform Memory Access (NUMA) architecture for a cluster of processors, etc. The inter-node connection topologies between different physical server nodes and the types of inter-node communication protocols that are used by the server nodes for network communication can include, but are not limited to, communication protocols such as TCP/IP, Gigabit Ethernet (GbE) (e.g., 10/25/40/100 GbE), RDMA, IB, Message Passing Interface (MPI), etc.

The deep learning computing platform 50 comprises a software platform to support deep learning tasks such as DL model training and inference processing (or classification), which are executed on the distributed computing system 100. The deep learning computing platform 50 can be implemented using known commercially available machine learning platforms such as Tensorflow, Microsoft Cognitive Toolkit (CNTK), Apache MXNet, Caffe, and other open-source deep learning frameworks that are configured to train, and deploy deep neural networks for HPC applications. The deep learning model layer 51 can implement one or more different types of models such as CNN models, recurrent neural network (RNN) models, region-based CNN (R-CNN) models, faster R-CNN models, mask R-CNN models, and other state-of-the-art DL models that are commonly utilized for high-performance DL computing applications.

The deep learning compute module 52 comprises software libraries and application programming interfaces (APIs) of one or more deep learning frameworks (e.g., Tensorflow NTK, MXNet, etc.), which include pre-written code, classes, procedures, scripts, configuration data, etc., which (i) can be called or otherwise utilized by the accelerator devices 132-1, 132-2, . . . , 132-N (e.g., GPU devices) of the respective worker nodes 130-1, 130-2, . . . , 130-N executing machine learning tasks and related functions, or which (ii) are utilized by control functions executing on host processor devices to access or communicate with the accelerator devices 132-1, 132-2, . . . , 132-N through the accelerator device drivers 54. The types of software libraries and APIs of the deep learning compute module 52 will vary depending on the particular framework of the deep learning computing platform 50.

For example, the deep learning compute module 52 can implement commercially available library and/or API platforms such CUDA®, which is a parallel computing platform and application programming interface created by NVIDIA. The CUDA API enables the use of CUDA-enabled GPUs for general purpose processing. The CUDA platform is a software layer that allows direct access to the instruction set and parallel computational elements of a GPU, for executing compute kernels. In particular, the NVIDIA CUDA API comprises the CUDA® Deep Neural Network library (cuDNN) library and the NVIDIA cuBLAS library. As is known in the art, cuDNN is a GPU-accelerated library of primitives for deep neural networks, which provides implementations for standard routines such as forward and backward propagation operations in DL models comprising convolution layers, pooling layers, normalization layers, activation layers, etc. The cuDNN library is utilized by various deep learning frameworks, such as Tensorflow, CNTK, MXNet, Keras, and Caffe, to support high-performance GPU acceleration. The NVIDIA cuBLAS library is a fast GPU-accelerated implementation of the standard basic linear algebra subroutines (BLAS). The cuBLAS APIs allow an application to be accelerated by deploying compute-intensive operations to a single GPU or distributing work across multi-GPU configurations. Keras is a high-level neural network API, written in Python and capable of running on top of TensorFlow and CNTK. In one embodiment, the accelerator device driver layer 54 comprises GPU drivers that are implemented using cuDNN.

The accelerator virtualization layer 55 comprises a virtualization engine and hypervisor platform, which are configured to create virtual accelerator resources (e.g., virtual GPUs) which allow virtual machines executing on the deep learning computing platform 50 to access and share the physical accelerator devices 132 with the worker node cluster (or server cluster). The accelerator device drivers 54 provide virtual drivers that allow the virtual machines to access and control the virtual accelerator resources that are instantiated within the accelerator virtualization layer. The accelerator virtualization layer 55 allows the deep learning computing platform 50 to provision a set of virtual accelerator resources to execute a data-parallel deep learning model training task using a hybrid set of different types of accelerator resources (e.g., GPUs, TPUs, etc.) with different performances and architectures.

In some embodiments, the deep learning computing platform 50 implements methods to perform a distributed SGD training process to train DL models using a data-parallel training process executed on the distributed computing system 100. As noted above, with an SGD training process, error gradients are computed for the model parameters of a DL model being trained using multiple iterations of a backpropagation process which comprises a sequence of three cycles including (i) a forward process, (ii) a backward process, and (iii) a weight update process, wherein the backpropagation process is repeated for many iterations until a convergence criterion is met. Each iteration of the backpropagation process is performed on a mini-batch of data, wherein a mini-batch of data comprises a subset (or portion) of a total dataset of model training data.

With a data parallel SGD model training process, the host system will access mini-batches of a training dataset from persistent storage, and store the mini-batches of data in a host system memory. For a given iteration of an SGD DL training process, a given mini-batch of data (M data samples) is accessed from host system memory and evenly distributed among the plurality of worker nodes 130-1, 130-2, . . . , 130-N, such that M/N data samples of the given mini-batch of data are transferred and copied to the memory of each accelerator device 132-1, 132-2, . . . , 132-N. During the data parallel DL model training process, each worker node 130 has access to a complete, updated copy of the given DL model being trained, which is maintained in the data stores of globally shared model parameters 112-1, 112-2, . . . , 112-S maintained by the respective parameter server nodes 110-1, 110-2, . . . , 110-S. The globally shared parameters represent the model parameters (e.g., dense/sparse vectors, weights, etc.) that are computed by worker nodes 130 during a training phase, and aggregated/combined/synchronized by the parameter server nodes 110.

During the DL training process, the worker nodes 130-1, 130-2, . . . , 130-N execute kernel functions on the respective accelerator devices 132-1, 132-2, . . . , 132-N to perform the forward, backward, and a weight update cycles of the backpropagation process. For each iteration backpropagation process, each worker node 130-1, 130-2, . . . , 130-N utilizes its local subset of mini-batch data to execute a forward propagation process on the DL model, followed by error backpropagation to compute gradients of the loss with respect to the DL network model parameters. In particular, the feed forward operation (forward process) is performed to process the subset of mini-batch data, layer by layer, using the given DL model. Once the information reaches the final output layer of the DL model, an error signal is calculated and back propagated through the layers of the DL model using a backward process, which involves minimizing an objective function by calculating error gradients with respect to model parameters (e.g., weights) and the input data. In this manner, for the given iteration, each worker node 130 computes a set of gradients of the DL model based on its local subset of the mini-batch of training data.

Following the forward and backward operation for the given iteration, each worker node 130 will communicate with one of the parameter server nodes 110 to send the locally computed parameters (gradients) to parameter server node 110. In some embodiments, there is one parameter server node 110 for each worker node 130. In other embodiments, each parameter server node 110 is assigned to two or more worker nodes 130. Each parameter server node 130 will receive a set of locally computed parameters from one or more associated worker nodes 130. The parameter server nodes 110-1, 110-2, . . . , 110-S will then communicate with each other (via an inter-PS communication protocol) to aggregate the local parameters (e.g., compute global average gradients) and update the DL model parameters, and then push the updated DL model parameters to the worker nodes 130.

For example, in some embodiments, the parameter server nodes 110-1, 110-2, . . . , 110-S send the local computed parameters (gradients) to one of the parameter server nodes 110 (all gather operation) which is designed to perform an all-reduce operation. The designated parameter server node 110 performs an all-reduce operation on the aggregated parameters by computing an average of all the local gradients provided by the worker nodes 130 for the given DL training iteration. The globally shared parameters 112-1, 112-2, . . . , 112-S on each of the parameter server nodes 110 are then globally updated with the computed gradient average, and each parameter server node 110 pushes the global updated parameters to the worker nodes 130. The worker nodes 130 then proceed to use the global updated parameters to perform a weight update process for the given iteration of the DL model training process. In this manner, the model parameters are managed and synchronized by the plurality of cooperating parameter server nodes 110 that collectively update the globally shared model parameters 112-1, 112-2, . . . , 112-S, which are shared across the worker nodes 130. With this framework, all state that is shared among the worker nodes 130 (i.e. the DL model parameters being learned) is maintained and synchronized by the parameter server nodes 110. At the end of each mini-batch iteration, each worker node 130 has a complete copy of the most recent (intermediate) DL model.

In accordance with embodiments of the invention, the self-adaptive batch dataset partitioning control module 53 implements an iterative batch size tuning process which is configured to determine an optimal job partition ratio for partitioning mini-batch datasets into sub-batch datasets for processing by a set of hybrid accelerator resources during a data-parallel DL model training process. The sub-batch datasets are partitioned into optimal batch sizes for processing by respective accelerator resources to minimize a time for completing the deep learning model training process. Exemplary operating modes and functions of the self-adaptive batch dataset partitioning control module 53 according to embodiments of the invention will be explained in further detail below with reference to FIGS. 3, 4 and 5, for example.

Figure 2:
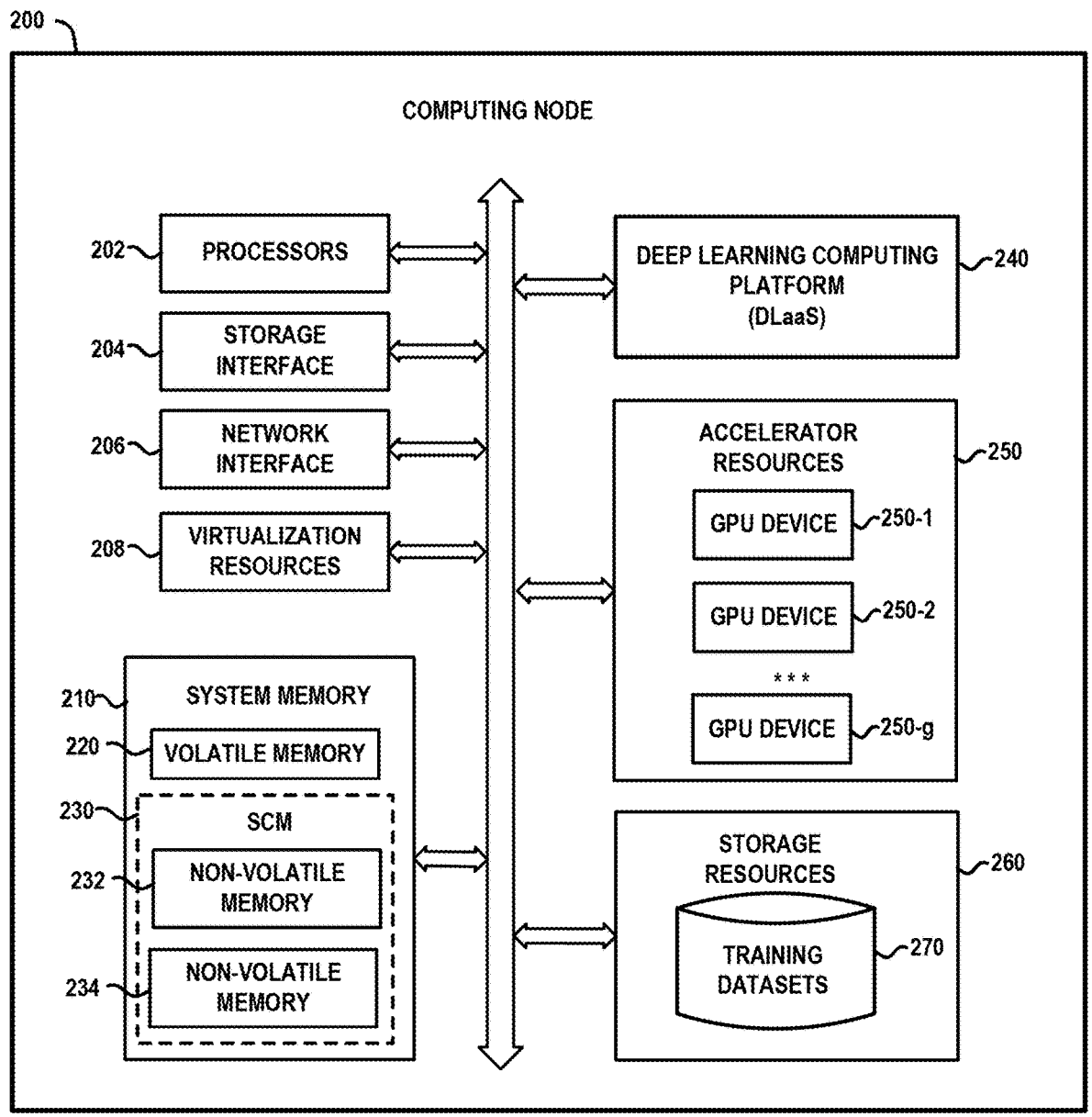
FIG. 2 schematically illustrates an embodiment of a computing node which can host the deep learning computing platform of FIG. 1, according to an embodiment of the invention.

FIG. 2 schematically illustrates an embodiment of a computing node 200 which can host the deep learning computing platform 50 of FIG. 1, according to an embodiment of the invention. The computing node 200 (e.g., server node) comprises processors 202, storage interface circuitry 204, network interface circuitry 206, virtualization resources 208, and system memory 210. The system memory 210 comprises volatile memory 220 and storage class memory 230. The computing node 200 hosts a deep learning computing platform 240, and comprises accelerator resources 250 and storage resources 260.

The processors 202 comprise one or more types of hardware processors that are configured to process program instructions and data to execute a native operating system (OS) and applications that run on the computing node 200. For example, the processors 202 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The storage interface circuitry 204 enables the processors 202 to interface and communicate with the system memory 210, the storage resources 260, and other local storage and off-infrastructure storage media, using one or more standard communication and/or storage control protocols to read data from or write data to volatile and non-volatile memory/storage devices. Such protocols include, but are not limited to, Non-Volatile Memory Express (NVMe), Peripheral Component Interconnect Express (PCIe), Parallel ATA (PATA), Serial ATA (SATA), Serial Attached SCSI (SAS), Fibre Channel, etc. The network interface circuitry 206 enables the computing node 200 to interface and communicate with a network and other system components. The network interface circuitry 206 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, direct memory access (DMA) and RDMA data transfer protocols, etc.

The virtualization resources 208 can be instantiated to execute one or more applications or functions which are hosted by the computing node 200. For example, the virtualization resources 208 can be configured to implement the various modules and functionalities of the deep learning computing platform 240. In one embodiment, the virtualization resources 208 comprise virtual machines that are implemented using a hypervisor platform which executes on the computing node 200, wherein one or more virtual machines can be instantiated to execute functions of the computing node 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the computing node 200, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 208 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the computing node 200 and the deep learning computing platform 240. In yet another embodiment, containers may be used in combination with other virtualization infrastructure such as virtual machines implemented using a hypervisor, wherein Docker containers or other types of LXCs are configured to run on virtual machines in a multi-tenant environment.

In one embodiment, the deep learning computing platform 240 comprises an architecture which is the same or similar to the deep learning computing platform 50 of FIG. 1. In one embodiment, the deep learning computing platform 50 can be configured on the computing node 200 to provide deep learning as a service (DLaaS). The constituent components of the deep learning computing platform 240 (e.g., components 51, 52, 53, 54, and 55 of the deep learning platform 50, FIG. 1) comprise software modules that are persistently stored in the local storage resources and loaded into the system memory 210 resources (e.g., volatile memory 220), and executed by the processors 202 to perform respective functions as described herein. In this regard, the system memory 210 resources, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The system memory 210 comprises various types of memory such as volatile random-access memory (RAM), non-volatile random-access memory (NVRAM), or other types of memory, in any combination. The term "memory" or "system memory" as used herein refers to volatile and/or non-volatile memory which is utilized to store application program instructions that are read and processed by the processors 202 to execute a native operating system and one or more applications hosted by the computing node 200, and to temporarily store data that is utilized and/or generated by the native OS and application programs running on the computing node 200. For example, the volatile memory 220 may be a dynamic random-access memory (DRAM) (e.g., DRAM DIMM (Dual In-line Memory Module), or other forms of volatile RAM. The storage-class memory (SCM) 230 comprises one or more types of non-volatile memory 232 and 234, which are accessible as a memory resource. For example, the non-volatile memory 232 and 234 may be one or more of a NAND Flash storage device, an SSD device, or other types of next generation non-volatile memory (NGNVM) devices. The non-volatile memory 232 and 234 can be implemented with any suitable NGNVM DIMM, or NGNVM add-in card (AIC) module.

The system memory 210 can be implemented using a hierarchical memory tier structure wherein the volatile system memory 220 is configured as the highest-level memory tier, and the non-volatile system memories 232 and 234 of the SCM 230 are configured as lower level memory tiers which are utilized as high-speed load/store non-volatile memory devices on the processor memory bus (i.e., data is accessed with loads and stores, instead of with I/O reads and writes).

The accelerator resources 250 comprise a plurality of GPU devices 250-1, 250-2, . . . , 250-g, and other types of accelerator resources (e.g., TPUs) which can be utilized to perform deep learning processing tasks as discussed herein. The storage resources 260 can include one or more hard disk drives (HDD), solid state drive (SSD) storage devices, etc. The storage resources 260 store various programs and data for performing deep learning model training tasks as discussed herein. For example, as shown in FIG. 2, the storage resources 260 are utilized to persistently store a database of one or more training datasets 270 which are used to train deep learning models, as discussed herein.

Figure 3:
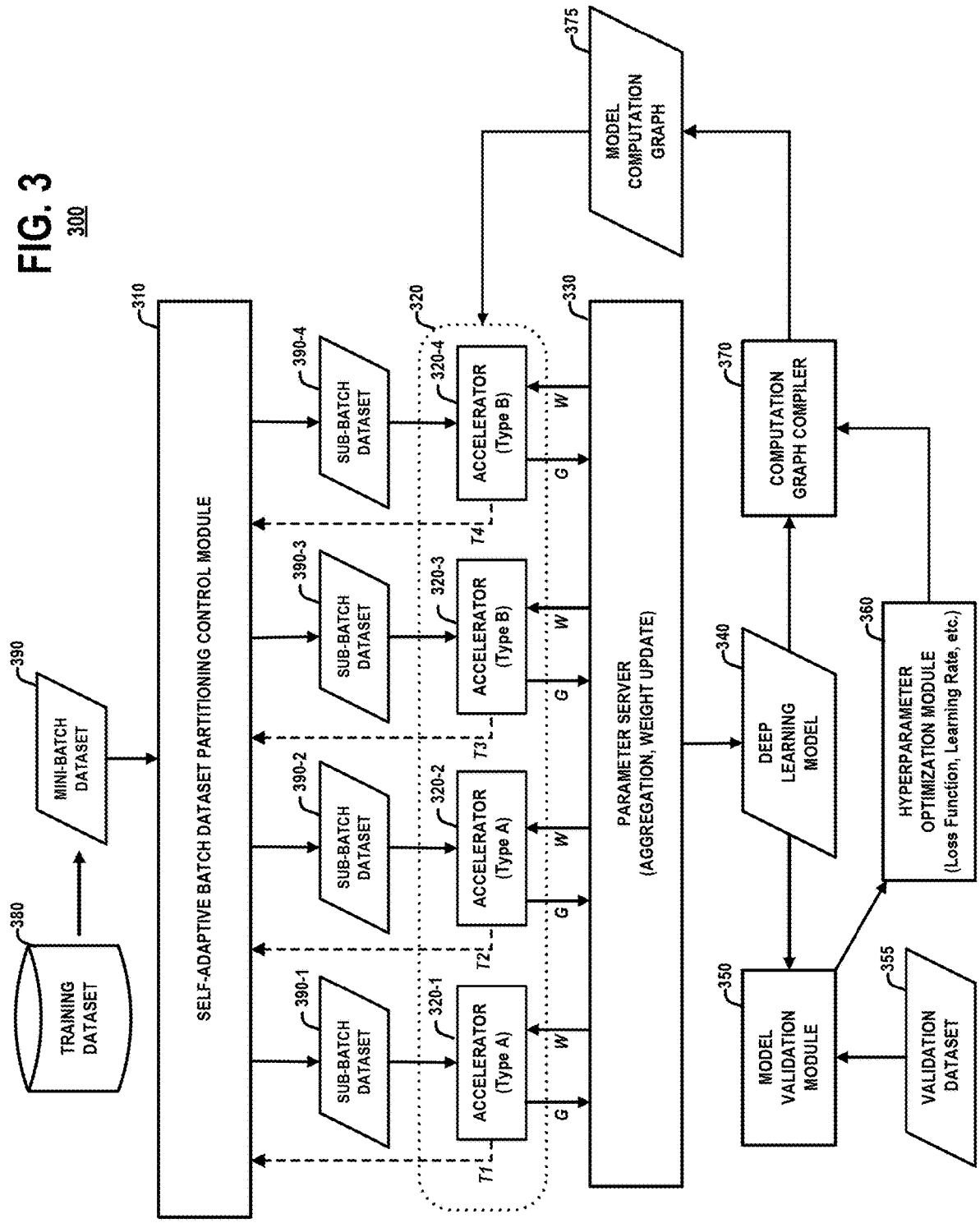
FIG. 3 schematically illustrates a computing system which implements a self-adaptive batch dataset partitioning control method to optimize load balancing among a set of accelerator resources for a distributed deep learning model training task, according to an embodiment of the invention.

FIG. 3 schematically illustrates a computing system 300 which implements a self-adaptive batch dataset partitioning control method to optimize load balancing among a set of accelerator resources for a distributed deep learning model training task, according to an embodiment of the invention. The computing system 300 comprises a self-adaptive batch dataset partitioning control module 310, accelerator resources 320, a parameter server 330, a deep learning model 340, a model validation module 350, a hyperparameter optimization module 360, and a computation graph compiler module 370. The accelerator resources 320 comprise a first accelerator 320-1, a second accelerator 320-2, a third accelerator 320-3, and a fourth accelerator 320-4. The accelerator resources 320 can be hardware accelerator devices, or virtual accelerators which are instantiated using container or virtual machines, or combination of containers and virtual machines. The accelerator resources 320 comprise a hybrid set of different types of accelerators (e.g., Type A and Type B). The model validation module 350 implements methods that are configured to validate the deep learning model 340 using a validation dataset 355. The model validation process is performed at the completion of each epoch iteration of a model training task in which a training dataset 380 is used to compute model parameters (e.g., weights of connections between neurons in an artificial neural network) of the deep learning model 340 using, for example, a supervised learning process such as stochastic gradient descent. The model validation module 350 provides an estimate of performance metrics of the deep learning model 340, e.g., an unbiased evaluation of the accuracy of a model fit on the training dataset 380 using the validation dataset 355. The validation dataset 355 comprises a set of data which is held back from the training process and which has a probability distribution which is the same or similar to the probability distribution of the training dataset 380.

The hyperparameter optimization module 360 implements methods that are configured for setting and tuning hyperparameters of the deep learning model 340. As is known in the art, the hyperparameters comprise parameters which define the model architecture (e.g., number of hidden layer) and parameters which determine how the model is trained (e.g., learning rate which defines a rate at which a model updates the model parameters). The validation results generated by the model validation module 350 are utilized by the hyperparameter optimization module 360 to tune the hyperparameters of the deep learning model 340. For machine learning tasks, a hyperparameter comprises a parameter whose value is set before a learning process begins. A deep learning model is tuned by nesting the optimization of model weights inside the optimization of hyperparameters. The optimization process determines model parameters which minimize the training/validation loss for the given hyperparameters. The hyperparameters are set before training (e.g., before optimizing the model weights and bias). Each set of hyperparameters is evaluated by re-initializing weights and training the model to completion.

The computation graph compiler 370 implements methods for computing a model computation graph 375 of the deep learning model 340 with current hyperparameter settings of the deep learning model 340. In general, the model computation graph 375 comprises a mutable directed graph with nodes that represent operations on data, and directed edges to/from and between nodes in the graph. The model computation graph 375 represents the data flow and computations that are performed for a given training process for a given deep learning model. The model computation graph 375 of the deep learning model 340 is duplicated and distributed to the accelerator resources 320 for execution of a deep learning model training process.

A data-parallel training process is performed by the computing system 300 over a plurality of training epochs. For each epoch, the parameters of the deep learning model 340 are trained using the entire training dataset 380. The number of epochs will vary depending the desired results. For example, the number of epochs may be performed until a validation accuracy starts to decrease. The training dataset 380 is divided into a plurality of mini-batch datasets, and one mini-batch data set 390 is processed at a given time. The mini-batch dataset 390 comprises a number of samples (or batch size). The batch size of the mini-batch dataset 390 can be a power of two (e.g., 32, 64, 128, 256, etc.) which fits the memory requirements of the processor hardware.

For given mini-batch iteration, the self-adaptive batch partitioning control module 310 partitions the current mini-batch dataset 390 into a plurality of sub-batch datasets 390-1, 390-2, 390-3, and 390-4. The sub-batch datasets 390-1, 390-2, 390-3, and 390-4 are copied to the respective accelerators 320-1, 320-2, 320-3, and 320-4. The accelerators 320-1, 320-2, 320-3, and 320-4 execute a model training task by processing the respective sub-batch datasets 390-1, 390-2, 390-3, and 390-4 using the model computation graph 375. The accelerators 320-1, 320-2, 320-3, and 320-4 compute gradients (G) using the respective sub-batch datasets 390-1, 390-2, 390-3, and 390-4 and send the processing results (e.g., gradients G) to the parameter server 330. The parameter server 330 aggregates the gradients (e.g., computes the sum or average of the gradients (G) over the current mini-batch dataset 390 to reduce the variance of the gradient). The parameter server 330 updates the model weights using the gradients received from the accelerators 320-1, 320-2, 320-3, and 320-4, and sends the updated weights (W) to the accelerators 320-1, 320-2, 320-3, and 320-4. The accelerators 320-1, 320-2, 320-3, and 320-4 update their local model (e.g., copy of model computation graph 375) with the updated weights.

The mini-batch iteration process is repeated for each mini-batch dataset of the training dataset 380. When all mini-batch datasets of the training dataset 380 have been processed, the parameter server 330 comprises a copy of the updated, intermediate deep learning model 340. The model validation module 350 then evaluates the learning performance of the deep learning module 340 using the validation dataset 355. The epoch iteration is then repeated.

During the model training process, the self-adaptive batch dataset partitioning control module 310 receives timing information T1, T2, T3, and T4 from the respective accelerators 320-1, 320-2, 320-3, and 320-4 for a given mini-batch iteration, which indicates the amount of time taken by the accelerators 320-1, 320-2, 320-3, and 320-4 to complete the processing of the respective sub-batch datasets 390-1, 390-2, 390-3, and 390-4 for the given mini-batch iteration. The self-adaptive batch dataset partitioning control module 310 utilizes the timing information T1, T2, T3, and T4 over multiple mini-batch iterations to determine an optimal job partition ratio for partitioning a mini-batch dataset into sub-batch datasets for processing by the accelerator resources 320. The self-adaptive batch dataset partitioning is performed to rebalance the processing loads among the accelerator resources over multiple mini-batch iterations to reach an optimal job partition ratio which results in the training process on each accelerator 320-1, 320-2, 320-3, and 320-4 completing at substantially the same time.

For example, in the exemplary embodiment of FIG. 3, assume that each mini-batch dataset 390 of the training dataset 380 comprises 128 samples of training data (e.g., 128 pictures). Assume further that the accelerators 320-1 and 320-2 (Type A) are faster than the accelerators 320-3 and 320-4 (Type B), wherein the Type A accelerators are implemented using, for example, NVIDIA Tesla P100 GPU Accelerators, and wherein the Type B accelerators are implemented using, for example, NVIDIA Tesla K40c GPU computing processors. If the mini-batch dataset 390 (of batch size 128) is evenly divided into four equal-size sub-batch datasets 390-1, 390-2, 390-3, and 390-4 (each with sub-batch size of 128/4=32), the slower accelerators 320-3 and 320-4 will be bottleneck for the training process, because the faster accelerators 320-1 and 320-2 will complete their jobs sooner, and the model weight update process performed by the parameter server 330 will need to wait until completion of the jobs by the slower accelerators 320-3 and 320-4. In this regard, the job partition ratio of 32:32:32:32 among the accelerators 320-1, 320-2, 320-3, and 320-4 is sub-optimal.

On the other hand, for a mini-batch dataset size of 128, the self-adaptive batch dataset partitioning control module 310 may determine (through an iterative load balancing process) that an optimal job partition ratio of 48:48:16:16 among the accelerators 320-1, 320-2, 320-3, and 320-4 results in the training tasks of the accelerators 320-1, 320-2, 320-3, and 320-4 completing at the same time (e.g., T1=T2=T3=T4) or substantially the same time (e.g., T1 T2 T3 T4). In this instance, the faster accelerators 320-1 and 320-2 can process the larger size sub-batch datasets 390-1 and 390-2 (sub-batch size=48) at substantially the same time it takes for the slower accelerators 320-3 and 320-4 to process the smaller size sub-batch datasets 390-3 and 390-4 (sub-batch size=16). Essentially, the optimal job partition ratio and associated load balancing among the accelerators 320 results in improved performance of the model training process in terms of faster training time, as the processing functions (aggregation and weight update) by the parameter server are not delayed by the slower accelerator resources.

Figure 4:
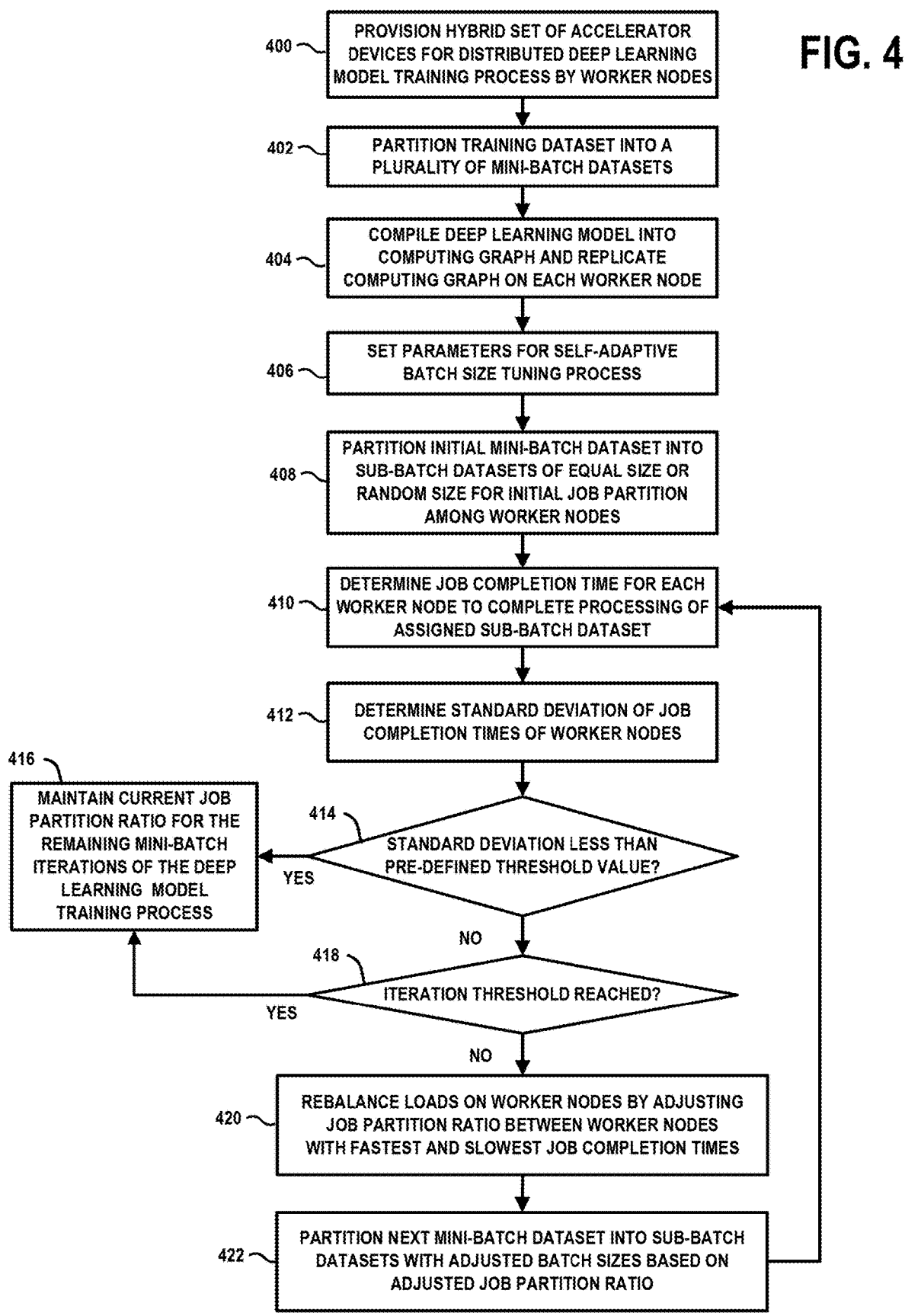
FIG. 4 is a flow diagram of a self-adaptive batch dataset partitioning control method which is implemented as part of a data-parallel deep learning model training process to optimize load balancing among a set of accelerator resources, according to an embodiment of the invention.

FIG. 4 is a flow diagram of a self-adaptive batch dataset partitioning control method which is implemented as part of a data-parallel deep learning model training process to optimize load balancing among a set of accelerator resources, according to an embodiment of the invention. FIG. 4 illustrates an exemplary mode of operation of, e.g., the self-adaptive batch dataset partitioning control module 310 of FIG. 3. An initial stage of a deep learning process comprises provisioning a set of accelerator devices for performing a deep learning model training process by a plurality of worker nodes in a sever cluster (block 400). In one embodiment the set of accelerator devices comprises a hybrid set of different types of accelerator devices (e.g., GPUs, TPUs, etc.) with different processing performances. As noted above, each worker node within the server cluster manages a worker process which is executed by a respective accelerator device, wherein the worker process can be implemented as a bare metal process, or a virtual process (e.g., a virtual machine, container application, etc.).

A training dataset for training a given deep learning model is partitioned into a plurality of mini-batch datasets (block 402). As noted above, the batch size of each mini-batch dataset can be a power of two, e.g., 32, 64, 128, 256, etc., to match memory requirements of the accelerator processor hardware. The batch size of the mini-batch data sets will vary depending on various factors such as, e.g., the overall size of the training dataset, the desired speed of convergence of the learning process, the number (N) of accelerator resources provisioned for the given job (e.g., 2, 4, 8, etc.), etc. The deep learning model is compiled with hyperparameter settings into a computing graph, and the computing graph is replicated to each worker node (block 404). A parameter initialization process is performed by the self-adaptive batch dataset partitioning control module 310 (FIG. 3) to set various parameters for a self-adaptive batch size tuning process (block 406). In one embodiment, the parameters include, for example, a standard deviation (SD) threshold value ($L_0$), a job partition ratio adjustment value ($K_0$), and a maximum iteration value ($T_0$). In one exemplary (non-limiting) embodiment, the parameters can be set to values such as, e.g., $L_0$=0.02, $K_0$=4, and $T_0$=32.

In one embodiment, the data parallel training process commences by accessing a first (initial) mini-batch dataset from system memory, and partitioning the initial mini-batch dataset into a plurality (N) of sub-batch datasets of equal size or random size (block 408), wherein N denotes the number of accelerators that are provisioned for the deep learning training task. In one embodiment, the initial (default) job partition ratio among the accelerators of the worker nodes is 1:1 (even job partition). For example, for a batch size of 128 samples, and N=4 accelerators, the initial mini-batch dataset would be partitioned into four (4) sub-batch datasets, each with a batch size of 32 (i.e., 128/4), i.e., 32:32:32:32.

In other embodiments, an initial default job partition ratio can be randomly set to some non-equal job partition ratio. By way of example, in one embodiment, an initial default job partition ratio can be set to some non-equal job partition ratio for the given set of provisioned accelerator resources based on a-priori knowledge of optimal partition ratios achieved for the same or similar sets of hybrid accelerator resources, or based on the relative performance (e.g., operating speeds) of the accelerator resources. The use of such a-priori knowledge to set the initial job partition ratio can result in a decrease in the number of iterations of the iterative job partitioning process needed to determine an optimal job partition ratio for the given set of accelerator resources (as compared to utilizing an initial default job partition ratio of 1:1).

The sub-batch datasets for the current mini-batch dataset are copied to the worker nodes for data-parallel processing by the accelerator resources. The self-adaptive batch dataset partitioning control module will determine (or otherwise obtain) a job completion time ($T_1$) for each worker node, which represents the time it takes for the accelerator of the worker node to complete processing of the assigned sub-batch dataset for the given mini-batch iteration (block 410). The self-adaptive batch dataset partitioning control module will then determine a standard deviation (SD) of the job completion times $T_i$ (for i=N) of the accelerators of the worker nodes resulting from the current job partition ratio for the current mini-batch iteration (block 412). The SD ($\sigma$) for the job completion times $T_i$ can be determined as follows:

$$\sigma = \sqrt{\frac{1}{N}\sum_{i}^{N}(T_i - \mu)^2}$$

where $\mu$ denotes a mean (or average) of all the job completion times $T_i$ of the accelerators for the given mini-batch iteration.

The SD value of the completion times $T_i$ of the accelerators for the given mini-batch iteration is then compared with the pre-specified SD threshold value $L_0$. If it is determined that the SD value of the completion times $T_i$ of the accelerators is less than $L_0$ (affirmative determination in block 414), the current job partition ratio is maintained for the remaining mini-batch iterations of the deep learning model training process (block 416). In this instance, the self-adaptive batch dataset partitioning control module will determine that an optimal job partition ratio has been reached for partitioning the mini-batch datasets for the remainder of the deep learning training process.

On the other hand, if it is determined that the SD value of the job completion times $T_i$ of the accelerators is not less than $L_0$ (negative determination in block 414), the control process determines whether the pre-specified iteration threshold value $T_0$ has been reached (block 418). The iteration threshold value $T_0$ is essentially a specified maximum number of iterations for performing the self-adaptive batch size tuning process. The iteration threshold value $T_0$ places a constraint on the number of tuning iterations for executing the self-adaptive batch size tuning process to, thereby, avoid any unnecessary waste of processing time and resources for performing the tuning process in the event that the optimal partition ratio does not, or cannot, result in job completion times with an SD that converges to less than the pre-specified SD threshold value $L_0$. In this instance, if the control process determines that the iteration threshold $T_0$ has been reached (affirmative determination in block 418), the control process determines that the most optimal job partition ratio has been reached, and the current job partition ratio is maintained for the remaining mini-batch iterations of the deep learning model training process (block 416).

On the other hand, if it is determined that the SD value of the job completion times $T_i$ of the accelerators is not less than $L_0$, and that the iteration threshold $T_0$ has not been reached (negative determinations in blocks 414 and 418), the control process proceeds to rebalance the loads of the worker nodes by adjusting the job partition ratio between the worker nodes with the accelerators that are determined to have the fastest and slowest job completion times for the given mini-batch interaction (block 420). For the next mini-batch iteration, the self-adaptive batch dataset partitioning control module will partition the mini-batch dataset into sub-batch datasets with adjusted batch sizes based on the adjusted job partition ratio (block 422).

The next iteration of the self-adaptive batch size tuning process continues (return to block 410) by determining the job completion times for the accelerators to complete the processing of sub-batch datasets of the next mini-batch iteration based on the adjusted job partition ratio. The iterative process (blocks 410, 412, 414, 418, 420, 422) continues for each subsequent mini-batch interaction until one of the conditions in block 414 and 418 are met, in which case the current job partition ratio is returned as the final job partition ratio which is maintained for the reminder of the mini-batch iteration for the given epoch of the deep learning training process (block 416).

Figure 5:
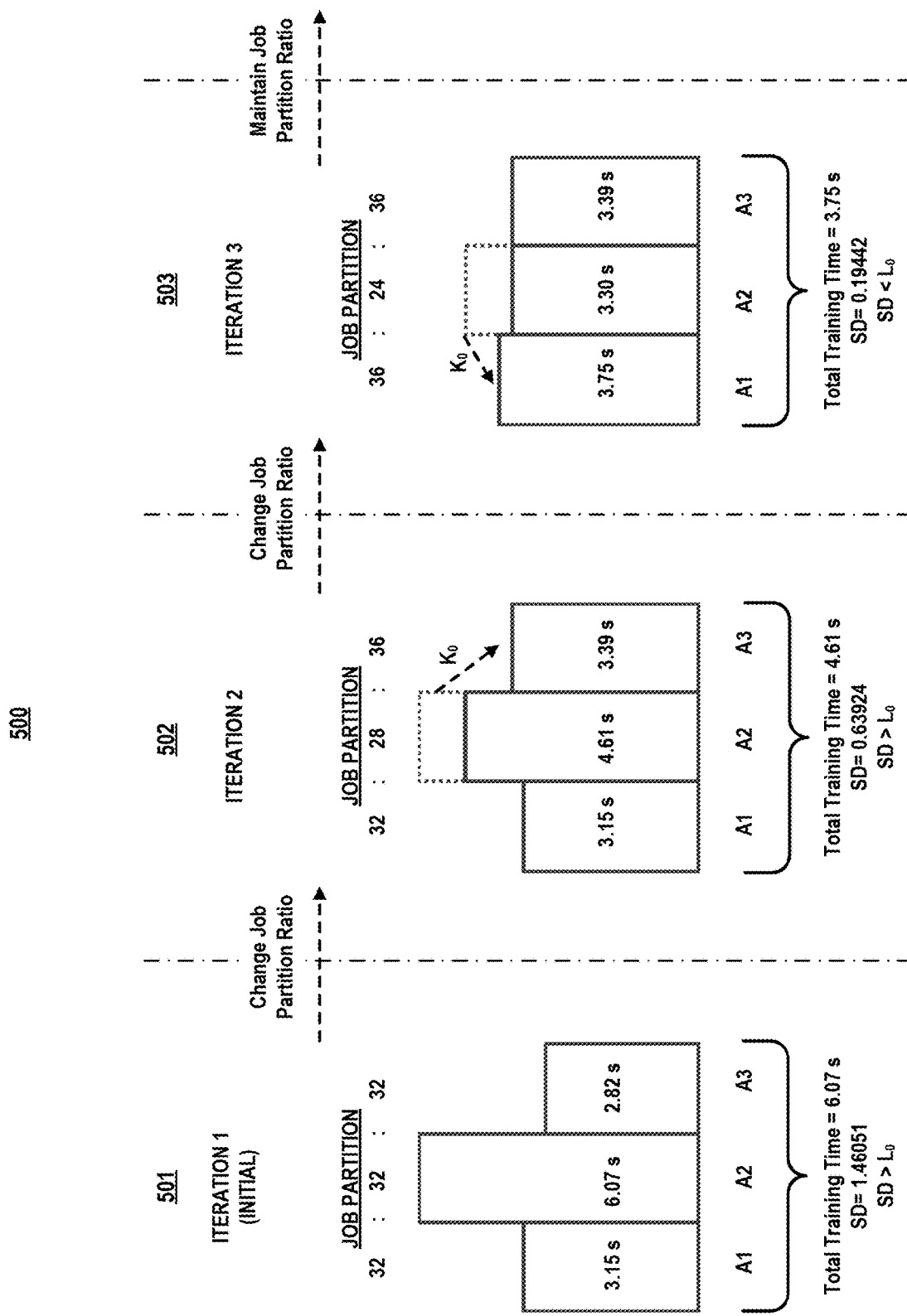
FIG. 5 schematically illustrates a self-adaptive batch dataset partitioning control method which is based on the process flow of FIG. 4, according to an embodiment of the invention.

FIG. 5 schematically illustrates a self-adaptive batch dataset partitioning control method according to an embodiment of the invention. In particular, FIG. 5 provides an illustrative example of a self-adaptive batch size tuning process 500 based on the process flow of FIG. 4, which is performed over three mini-batch iterations 501, 502 and 503 of a data-parallel deep learning model training process that is performed using three accelerators A1, A2 and A3. In this example, the SD threshold value $L_0$=0.02, and the job partition ratio adjustment value $K_0$=4.

As illustrated in FIG. 5, in the first (initial) mini-batch iteration 501, a default job partition ratio is applied wherein a mini-batch dataset with a batch size of 96 is equally partitioned among the accelerators A1, A2, and A3. In particular, in this example, each accelerator A1, A2 and A3 is assigned to process a sub-batch dataset with a batch size of 32, such that the partition ratio is 32:32:32. FIG. 5 shows the job completion times $T_i$ of the accelerators A1, A2, and A3 in the initial mini-batch iteration to be 3.15 seconds (sec), 6.07 sec, and 2.82 sec, which results in a SD=1.4650 for the job completion times in the initial mini-batch iteration 501. A total training time for the initial mini-batch iteration 501 is 6.07 sec, which corresponds to largest job completion time $T_2$ of the accelerator A2. The accelerator A3 is shown to have the shortest job completion time $T_3$=2.82 sec in the first mini-batch iteration 501.

Since SD>$L_0$ in the first mini-batch iteration 501, the control process utilizes the partition ratio adjustment value $K_0$=4 to adjust the job partition load between the second and third accelerators A2 and A3 which are found to have the slowest and fastest job completion times, respectively. In particular, in an exemplary embodiment, the job partition (size of sub-batch dataset) for the second accelerator A2 is reduced by $K_0$=4 samples, while the job partition (size of sub-batch dataset) for the third accelerator A3 is increased by $K_0$=4 samples. This process results in an adjusted job partition ratio of 32:28:36 for the accelerators A1, A2 and A3, which is applied in the next mini-batch iteration 502.

In particular, as illustrated in FIG. 5, in the second mini-batch iteration 502, the adjusted job partition ratio 32:28:36 is applied, wherein the next mini-batch dataset with a batch size of 96 is partitioned among the accelerators A1, A2, and A3 with respective sub-batch dataset sizes of 32, 28 and 36, respectively. FIG. 5 shows the job completion times $T_i$ of the accelerators A1, A2, and A3 in the second mini-batch iteration 502 to be 3.15 sec, 4.61 sec, and 3.39 sec, which results in a SD=0.63924 for the job completion times in the second mini-batch iteration 502. A total training time for the second mini-batch iteration 502 is 4.61 sec, which corresponds to largest job completion time $T_2$ of the accelerator A2. The accelerator A1 is shown to have the shortest job completion time $T_1$=3.15 sec in the second mini-batch iteration 502.

Since SD>$L_0$ in the second mini-batch iteration 502, the control process utilizes the partition ratio adjustment value $K_0$=4 to adjust the job partition load between the second and first accelerators A2 and A1 which are found to have the slowest and fastest job completion times, respectively, in the second mini-batch iteration 502. In particular, in the exemplary embodiment, the job partition (size of sub-batch dataset) for the second accelerator A2 is further reduced by $K_0$=4 samples, while the job partition (size of sub-batch dataset) for the first accelerator A1 is increased by $K_0$=4 samples. This process results in an adjusted job partition ratio of 36:24:36 for the accelerators A1, A2, and A3, which is applied in the next mini-batch iteration 503.

In particular, as illustrated in FIG. 5, in the third mini-batch iteration 503, the adjusted job partition ratio 36:24:36 is applied wherein the next mini-batch dataset with a batch size of 96 is partitioned among the accelerators A1, A2, and A3 with sub-batch dataset sizes of 36, 24, and 36, respectively. FIG. 5 shows the job completion times $T_i$ of the accelerators A1, A2, and A3 in the third mini-batch iteration 503 to be 3.75 sec, 3.30 sec, and 3.39 sec, which results in a SD=0.19442 for the job completion times in the third mini-batch iteration 503. A total training time for the third mini-batch iteration 503 is 3.75 sec, which corresponds to largest job completion time $T_1$ of the accelerator A1. The accelerator A2 is shown to have the shortest job completion time $T_2$=3.30 sec in the third mini-batch iteration 503.

Since SD<$L_0$ in the third mini-batch iteration 503, the control process terminates the iterative self-adaptive batch size tuning process, and maintains the current job partition ratio of 36:24:36 for the remaining mini-batch iterations of the deep learning model training process. As shown in FIG. 5, the self-adaptive batch size tuning process iteratively adjusts the job partition ratio among the accelerators to achieve an optimal job partition ratio, which reduces the total training time of the mini-batch iteration from 6.07 sec to 3.75 sec.

Figure 6:
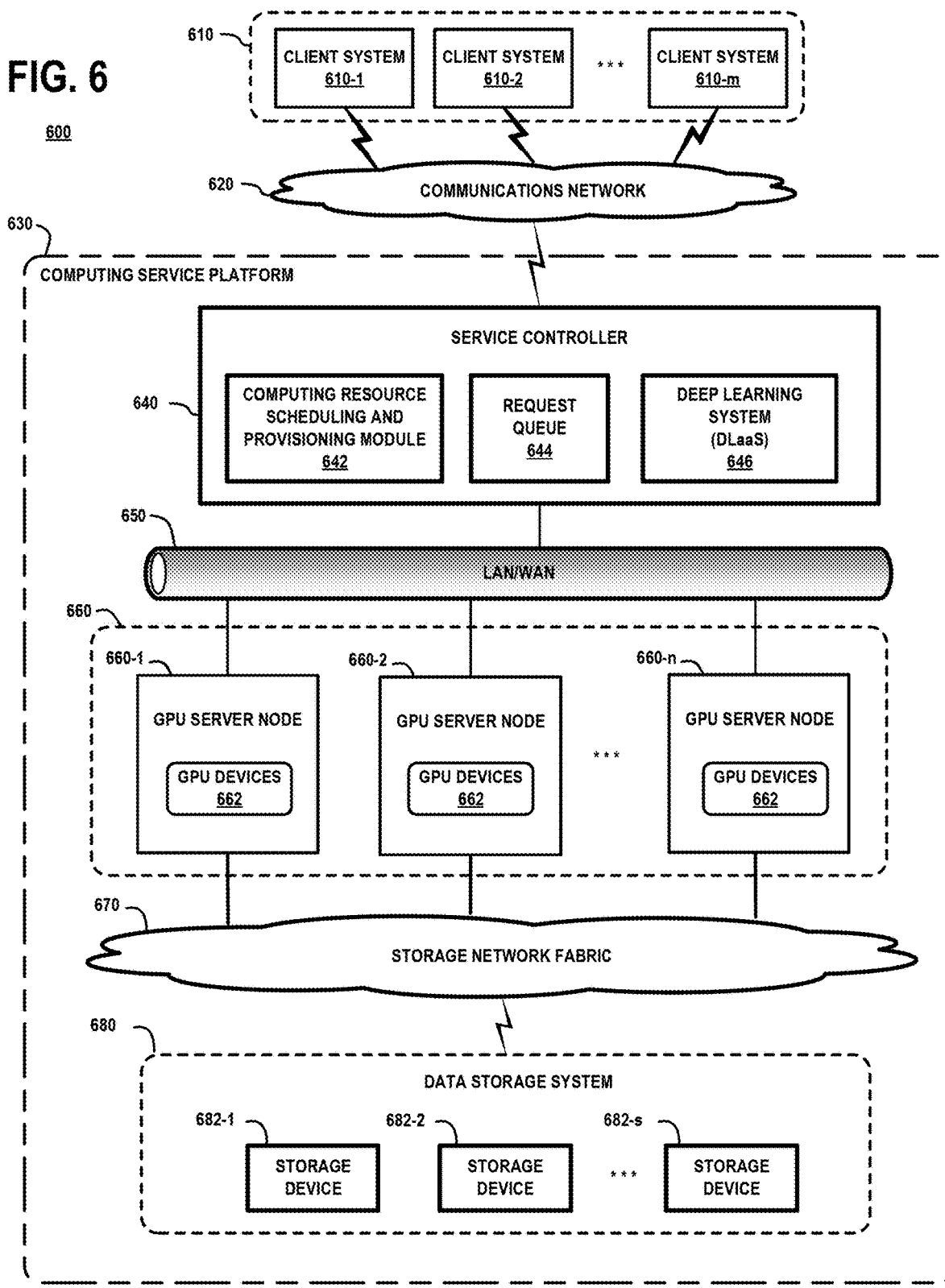
FIG. 6 is a high-level schematic illustration of a computing system which comprises a cloud computing service platform configured to provide a deep learning as a service (DLaaS) which implements self-adaptive batch dataset partitioning control methods to optimize load balancing among a set of accelerator resources for a distributed deep learning model training task, according to an embodiment of the invention.

It is to be appreciated that the computing node of FIG. 2 can be utilized in a cloud computing system to provide DLaaS as part of a Platform-as-Service (PaaS) cloud computing model that supports application development to customers for HPC applications including DL training and inference processing. For example, FIG. 6 is a high-level schematic illustration of a computing system 600 which comprises a cloud computing service platform configured to provide a deep learning as a service (DLaaS) which implements self-adaptive batch dataset partitioning control methods to optimize load balancing among a set of accelerator resources for a distributed deep learning model training task, according to an embodiment of the invention. The computing system 600 comprises a plurality (m) of client systems 610-1, 610-2, ..., 610-m (collectively referred to as client systems 610), a communications network 620, and a cloud computing service platform 630 which can be accessed by the client systems 610 over the communications network 620. The cloud computing service platform 630 comprises a service controller 640 (e.g., a control server node), a service platform network 650, a server cluster 660 (e.g., server farm) comprising a plurality (n) of GPU server nodes 660-1, 660-2, ..., 660-n, a storage network fabric 670, and a data storage system 680 comprising a plurality (s) of data storage devices 682-1, 682-2, ..., 682-s. The service controller 640 comprises a computing resource scheduling and provisioning module 642, a request queue 644, and a deep learning system 646 (which supports DLaaS). The GPU server nodes 660-1, 660-2, ..., 660-n comprise GPU devices 662, as well as other possible computing resources including, but not limited to, CPUs, FPGA devices, ASIC devices, tensor processing units (TPUs), image processing units (IPUs), and other hardware accelerator systems that are configured to support the HPC service(s) provided by the cloud computing service platform 630. The server cluster 660 comprises a heterogeneous cluster of GPU server nodes which can have heterogenous accelerator resources (e.g., different types of GPU devices, TPUs, etc.) Furthermore, the GPU server nodes 660-1, 660-2, ..., 660-n of the server cluster 660 may implement one of many types of commercially available server operations systems including, but not limited to, a Windows server, a Sun Solaris server, an HP server, a Linux server, etc.

The client systems 610 comprise various types of computing devices such as desktop computers, laptop computers, electronic tablets, etc. In another embodiment, the client systems 610 may comprise servers in a data center which require GPU processing services. The communications network 620 is configured to enable network communication between the client systems 610 and the service platform 630. While the communications network 620 is generically depicted in FIG. 6, it is to be understood that the communications network 620 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 620 in some embodiments comprises combinations of multiple different types of communications networks each comprising network devices configured to communicate using Internet Protocol (IP) or other related communication protocols. The network 620 comprises intermediate points (such as routers, switches, etc.) and other elements that form a network backbone to establish communication paths and enable communication between network endpoints.

The service platform network 650 is configured to enable communication between the service controller 640 and the GPU server nodes 660-1, 660-2, . . . , 660-n of the server cluster 660, as well as to enable peer-to-peer network communication between the GPU server nodes 660-1, 660-2, . . . , 660-n within the server cluster 660. Depending on the network distribution and geographic location of the constituent components and nodes of the service platform 630, the service platform network 650 may comprise, for example, a LAN, a WAN, or a combination of one or more LANs and WANs, as well as other types of communications networks that are commonly used to implement cloud computing platforms. The storage network fabric 670 can be implemented using any suitable networking system and protocol to enable shared access to the data storage system 680 by the GPU server nodes 660-1, 660-2, . . . , 660-n of the server cluster 660. In one embodiment, the service platform network 650 and the storage network fabric 670 can be integrated into a converged framework such as a converged Ethernet framework using known techniques.

The data storage system 680 can be implemented using any suitable data storage system, or combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure. The data storage devices 682-1, 682-2, . . . , 682-s comprise non-volatile storage media to provide persistent storage resources for the GPU server nodes 660-1, 660-2, . . . , 660-n of the server cluster 660 (e.g., to store training data used for deep learning applications). The data storage devices 682-1, 682-2, . . . , 682-s may include one or more different types of persistent storage devices, or data storage arrays, such as hard disk drives (HDDs) or solid-state drives (SSDs), or other types and combinations of non-volatile memory. In one embodiment, the data storage devices 682-1, 682-2, . . . , 682-s are implemented using, for example, an enterprise-class storage platform comprising high performance, scalable storage arrays, which can be implemented for hyper-scale computing systems.

The cloud computing service platform 630 can be a private or public cloud computing platform which implements a PaaS system to provide computing services to end-users or customers for HPC applications such as deep learning applications, machine learning, Big Data processing applications, or other types of HPC applications that are typically implemented using a cloud-based PaaS system deliver consumer or business applications and services to multiple end users, service providers, and/or organizations. The service controller 640 is configured to control various functionalities of the cloud computing platform 630 to support PaaS management operations. For example, as shown in FIG. 6, the service controller 640 is configured to control and manage the deep learning system 646 to provide a cloud-based DLaaS. In one embodiment, the deep learning system 646 implements a deep learning computing platform which is the same or similar to the deep learning computing platform 50 of FIG. 1, which implements self-adaptive batch dataset partitioning control methods to optimize load balancing among a set of accelerator resources for distributed computing jobs such as DL model training tasks, etc.

The service controller 640 receives service requests from the client systems 610 for executing HPC jobs on the server cluster 660 (e.g., distributed DL training, or other HPC jobs), and the received service requests are stored in the request queue 644. The service controller 640 utilizes the computing resource scheduling and provisioning module 642 to schedule and provision computing resources in the server cluster 660 for jobs pending in the request queue 644. A service request can include various user-specified conditions and demands for executing a given job (e.g., DL training) associated with the service request. For example, a service request may specify (i) a desired number (N) of accelerator devices (e.g., GPU devices) to provision for the requested job, (ii) a specific type/model of accelerator device (e.g., NVidia P100 GPU, Tensor flow TPU, etc.) to be utilized for the requested job, (iii) whether the provisioned accelerator devices should be exclusively allocated for the requested job or can be shared with other jobs, and/or (iv) other conditions based on a service level agreement (SLA) with the given client. In addition, the provisioning of accelerator resources for pending jobs can be based on predefined policies of the service provider for handing specific types of jobs.

The service request and associated provisioning specifications are stored in the request queue 644 pending scheduling by the computing resource scheduling and provisioning module 642. The underlying infrastructure of server resources (e.g., server cluster 660), networking resources (e.g., LAN/WAN 650, storage network fabric 670), and data storage resources (e.g., data storage system 680 and storage devices 682) is configured to provide a cloud-based Infrastructure-as-a-Service (IaaS) platform, which comprises a heterogeneous cluster of resources that are utilized by the computing resource scheduling and provisioning module 642 to provision a set of resources (e.g., hardware accelerator devices) needed to execute pending jobs in the request queue 644.

The computing resource scheduling and provisioning module 642 can implement any suitable method or protocol for selecting, allocating, scheduling and provisioning one or more GPU server nodes and associated accelerator resources (e.g., GPU devices) for executing HPC workloads associated with client service requests, depending on various factors including, but not limited to, the available GPU devices and processing resources of the GPU server nodes, the nature of the GPU processing tasks associated with the service request, user-specified conditions and resource demands for executing a given job, conditions based on a service level agreement (SLA) with the given client, predefined policies of the service provider for handing specific types of jobs, etc.

For example, in one embodiment of the invention, the computing resource scheduling and provisioning module 642 can manage the scheduling and execution of pending GPU processing tasks from multiple client systems using queue-based GPU virtualization and management systems and methods as disclosed in commonly assigned U.S. patent application Ser. No. 15/391,223, filed on Dec. 27, 2016, entitled "Queue-Based GPU Virtualization and Management System," the disclosure of which is incorporated herein by reference. A queue-based GPU virtualization and management system allows the client systems 610 to share the GPU devices 662 of a given GPU server node temporally and/or spatially. For example, in one embodiment, the utilization of the GPU device is shared temporally, wherein a given GPU device can be allocated to two or more client systems, and wherein the tasks of the two or more client systems are executed on the same allocated GPU device at different times. In another embodiment, a given GPU device can be allocated to two or more client systems such that utilization of the given GPU device is shared spatially, wherein the different tasks of the two or more client systems are concurrently executed on the given GPU device using different regions (threads, cores) of the given GPU device.

For a multi-GPU sever node allocation wherein multiple GPU devices 662 across multiple GPU server nodes in the server cluster 660 are allocated to a given client system, the computing resource scheduling and provisioning module 642 is configured to communicate with the GPU server nodes 660 to provision GPU resources, allocate master and slave GPU server nodes, and command the allocated GPU server nodes to logically bind together and establish communication links to conduct peer-to-peer operations for executing the GPU processing tasks associated with the client request. Such techniques are disclosed in commonly assigned U.S. patent application Ser. No. 15/487,887, filed on Apr. 14, 2017, entitled "Managing Access to a Resource Pool of Graphics Processing Units Under Fine Grain Control," the disclosure of which is incorporated herein by reference. With such techniques, a given client system will see a larger logical GPU server node, while a master GPU server node coordinates and manages execution of the GPU processing tasks across all of the allocated GPU server nodes with fine grain control, transparently to the client system.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
provisioning a plurality of accelerator resources on one or more server nodes of a computing system to execute a distributed deep learning model training process to train a deep learning model;
partitioning a training dataset into a plurality of mini-batch datasets;
partitioning an initial mini-batch dataset into a plurality of sub-batch datasets according to an initial job partition ratio;
performing an initial mini-batch iteration of the distributed deep learning model training process by each of the accelerator resources processing a corresponding one of the sub-batch datasets of the initial mini-batch dataset; and
performing an iterative batch size tuning process to iteratively adjust the job partition ratio for subsequent mini-batch iterations of the distributed deep learning model training process, wherein the iterative batch size tuning process comprises:
determining a job completion time for each of the accelerator resources to complete processing of the corresponding one of the sub-batch datasets of the initial mini-batch dataset;
determining an amount of variation of the job completion times of the accelerator resources as a result of the initial job partition ratio for the initial mini-batch iteration;
comparing the determined amount of variation to a variation threshold; and
responsive to the determined amount of variation of the job completion times exceeding the variation threshold, adjusting the job partition ratio for partitioning a next mini-batch dataset into sub-batch datasets for a next mini-batch iteration of the distributed deep learning model training process.

2. The method of claim 1, wherein adjusting the job partition ratio for partitioning the next mini-batch dataset into the plurality of sub-batch datasets for the next mini-batch iteration of the distributed deep learning model training process comprises:
determining an accelerator resource having a fastest job completion time for the initial mini-batch iteration;
determining an accelerator resource having a slowest job completion time for the initial mini-batch iteration; and
adjusting the job partition ratio between the accelerator resources determined to have the fastest and the slowest job completion times, based on a job partition ratio adjustment value.

3. The method of claim 2, wherein adjusting the job partition ratio between the accelerator resources determined to have the fastest and the slowest job completion times comprises:
reducing a size of the sub-batch dataset assigned to the accelerator resource determined to have the slowest job completion time, by an amount which corresponds to the job partition ratio adjustment value; and
increasing a size of the sub-batch dataset assigned to the accelerator resource determined to have the fastest job completion time, by an amount which corresponds to the job partition ratio adjustment value.

4. The method of claim 1, wherein partitioning the initial mini-batch dataset into the plurality of sub-batch datasets according to the initial job partition ratio comprises partitioning the initial mini-batch dataset into a plurality of sub-batch datasets of equal size.

5. The method of claim 1, wherein partitioning the initial mini-batch dataset into the plurality of sub-batch datasets according to the initial job partition ratio comprises partitioning the initial mini-batch dataset into a plurality of sub-batch datasets wherein at least some of the sub-batch datasets are non-equal size.

6. The method of claim 1, wherein performing the iterative batch size tuning process to iteratively adjust the job partition ratio for subsequent mini-batch iterations of the distributed deep learning model training process, further comprises:

for a current mini-batch iteration:
  partitioning a current mini-batch dataset into a plurality of sub-batch datasets according to a current job partition ratio;
  determining a job completion time for each of the accelerator resources to complete processing of the corresponding one of the sub-batch datasets of the current mini-batch dataset;
  determining an amount of variation of the job completion times of the accelerator resources as a result of the current job partition ratio for the current mini-batch iteration;
  comparing the determined amount of variation to the variation threshold;
  responsive to the determined amount of variation of the job completion times exceeding the variation threshold, adjusting the job partition ratio for partitioning a next mini-batch dataset into a plurality of sub-batch datasets for a next mini-batch iteration of the distributed deep learning model training process; and
  responsive to the determined amount of variation of the job completion times not exceeding the variation threshold, maintaining the current job partition ratio for partitioning remaining mini-batch datasets into a plurality of sub-batch datasets for remaining mini-batch iterations of the distributed deep learning model training process.

7. The method of claim 6, further comprising:
  responsive to the determined amount of variation of the job completion times for the current mini-batch iteration exceeding the variation threshold, determining whether an iteration threshold has been reached; and
  maintaining the current job partition ratio for partitioning remaining mini-batch datasets into a plurality of sub-batch datasets for remaining mini-batch iterations of the distributed deep learning model training process, in response to determining that the iteration threshold has been reached.

8. The method of claim 6, wherein adjusting the job partition ratio for partitioning the next mini-batch dataset into the plurality of sub-batch datasets for the next mini-batch iteration of the distributed deep learning model training process comprises:
  determining an accelerator resource having a fastest job completion time for the current mini-batch iteration;
  determining an accelerator resource having a slowest job completion time for the current mini-batch iteration; and
  adjusting the job partition ratio between the accelerator resources determined to have the fastest and the slowest job completion times, based on a job partition ratio adjustment value.

9. The method of claim 1, wherein provisioning the plurality of accelerator resources comprises provisioning a hybrid set of graphics processing unit (GPUs) resources.

10. The method of claim 1, wherein provisioning the plurality of accelerator resources comprises provisioning a hybrid set of virtual accelerator resources.

11. The method of claim 1, wherein the amount of variation is determined based at least in part on a standard deviation of the job completion times.

12. An article of manufacture comprising a processor-readable storage medium having stored program code of one or more software programs, wherein the program code is executable by one or more processors to implement method steps comprising:
  provisioning a plurality of accelerator resources on one or more server nodes of a computing system to execute a distributed deep learning model training process to train a deep learning model;
  partitioning a training dataset into a plurality of mini-batch datasets;
  partitioning an initial mini-batch dataset into a plurality of sub-batch datasets according to an initial job partition ratio;
  performing an initial mini-batch iteration of the distributed deep learning model training process by each of the accelerator resources processing a corresponding one of the sub-batch datasets of the initial mini-batch dataset; and
  performing an iterative batch size tuning process to iteratively adjust the job partition ratio for subsequent mini-batch iterations of the distributed deep learning model training process, wherein the iterative batch size tuning process comprises:
    determining a job completion time for each of the accelerator resources to complete processing of the corresponding one of the sub-batch datasets of the initial mini-batch dataset;
    determining a standard deviation of the job completion times of the accelerator resources as a result of the initial job partition ratio for the initial mini-batch iteration;
    comparing the determined amount of variation to a variation threshold; and
    responsive to the determined amount of variation of the job completion times exceeding the variation threshold, adjusting the job partition ratio for partitioning a next mini-batch dataset into sub-batch datasets for a next mini-batch iteration of the distributed deep learning model training process.

13. The article of manufacture of claim 12, wherein adjusting the job partition ratio for partitioning the next mini-batch dataset into a plurality of sub-batch datasets for the next mini-batch iteration of the distributed deep learning model training process comprises:
  determining an accelerator resource having a fastest job completion time for the initial mini-batch iteration;
  determining an accelerator resource having a slowest job completion time for the initial mini-batch iteration; and
  adjusting the job partition ratio between the accelerator resources determined to have the fastest and the slowest job completion times, based on a job partition ratio adjustment value.

14. The article of manufacture of claim 13, wherein adjusting the job partition ratio between the accelerator resources determined to have the fastest and the slowest job completion times comprises:
  reducing a size of the sub-batch dataset assigned to the accelerator resource determined to have the slowest job completion time, by an amount which corresponds to the job partition ratio adjustment value; and
  increasing a size of the sub-batch dataset assigned to the accelerator resource determined to have the fastest job completion time, by an amount which corresponds to the job partition ratio adjustment value.

15. The article of manufacture of claim 12, wherein partitioning the initial mini-batch dataset into the plurality of sub-batch datasets according to the initial job partition ratio comprises one of (i) partitioning the initial mini-batch dataset into a plurality of sub-batch datasets of equal size and (ii) partitioning the initial mini-batch dataset into a plurality of sub-batch datasets wherein at least some of the sub-batch datasets are non-equal size.

16. The article of manufacture of claim 12, wherein performing the iterative batch size tuning process to iteratively adjust the job partition ratio for subsequent mini-batch iterations of the distributed deep learning model training process, further comprises:
for a current mini-batch iteration:
partitioning a current mini-batch dataset into a plurality of sub-batch datasets according to a current job partition ratio;
determining a job completion time for each of the accelerator resources to complete processing of the corresponding one of the sub-batch datasets of the current mini-batch dataset;
determining a standard deviation of the job completion times of the accelerator resources as a result of the current job partition ratio for the current mini-batch iteration;
comparing the determined amount of variation to the variation threshold;
responsive to the determined amount of variation of the job completion times exceeding the variation threshold, adjusting the job partition ratio for partitioning a next mini-batch dataset into a plurality of sub-batch datasets for a next mini-batch iteration of the distributed deep learning model training process;
responsive to the determined amount of variation of the job completion times not exceeding the variation threshold, maintaining the current job partition ratio for partitioning remaining mini-batch datasets into a plurality of sub-batch datasets for remaining mini-batch iterations of the distributed deep learning model training process; and
responsive to the determined amount of variation of the job completion times for the current mini-batch iteration exceeding the variation threshold, determining whether an iteration threshold has been reached; and
maintaining the current job partition ratio for partitioning remaining mini-batch datasets into a plurality of sub-batch datasets for remaining mini-batch iterations of the distributed deep learning model training process, in response to determining that the iteration threshold has been reached.

17. The article of manufacture of claim 16, wherein adjusting the job partition ratio for partitioning the next mini-batch dataset into the plurality of sub-batch datasets for the next mini-batch iteration of the distributed deep learning model training process comprises:
determining an accelerator resource having a fastest job completion time for the current mini-batch iteration;
determining an accelerator resource having a slowest job completion time for the current mini-batch iteration; and
adjusting the job partition ratio between the accelerator resources determined to have the fastest and the slowest job completion times, based on a pre specified job partition ratio adjustment value.

18. The article of manufacture of claim 12, wherein provisioning the plurality of accelerator resources comprises provisioning a hybrid set of virtual accelerator resources, wherein the virtual accelerator resources comprise virtual graphics processing unit resources.

19. The article of manufacture of claim 12, wherein the amount of variation is determined based at least in part on a standard deviation of the job completion times.

20. A system, comprising:
a server cluster comprising a plurality of server nodes, wherein the server nodes comprise accelerator resources;
a control server node comprising a memory to store program instructions, and a processor to execute the stored program instructions to cause the control server node to perform a process which comprises:
provisioning a plurality of accelerator resources on one or more of the server nodes of the server cluster to execute a distributed deep learning model training process to train a deep learning model;
partitioning a training dataset into a plurality of mini-batch datasets;
partitioning an initial mini-batch dataset into a plurality of sub-batch datasets according to an initial job partition ratio;
performing an initial mini-batch iteration of the distributed deep learning model training process by each of the accelerator resources processing a corresponding one of the sub-batch datasets of the initial mini-batch dataset; and
performing an iterative batch size tuning process to iteratively adjust the job partition ratio for subsequent mini-batch iterations of the distributed deep learning model training process, wherein the iterative batch size tuning process comprises:
determining a job completion time for each of the accelerator resources to complete processing of the corresponding one of the sub-batch datasets of the initial mini-batch dataset;
determining a standard deviation of the job completion times of the accelerator resources as a result of the initial job partition ratio for the initial mini-batch iteration;
comparing the determined amount of variation to a variation threshold; and
responsive to the determined amount of variation of the job completion times exceeding the variation threshold, adjusting the job partition ratio for partitioning a next mini-batch dataset into a plurality of sub-batch datasets for a next mini-batch iteration of the distributed deep learning model training process.

21. The system of claim 20, wherein adjusting the job partition ratio for partitioning the next mini-batch dataset into the plurality of sub-batch datasets for the next mini-batch iteration of the distributed deep learning model training process comprises:
determining an accelerator resource having a fastest job completion time for the initial mini-batch iteration;
determining an accelerator resource having a slowest job completion time for the initial mini-batch iteration; and
adjusting the job partition ratio between the accelerator resources determined to have the fastest and the slowest job completion times, based on a job partition ratio adjustment value, wherein adjusting the job partition ratio between the accelerator resources determined to have the fastest and the slowest job completion times comprises:
reducing a size of the sub-batch dataset assigned to the accelerator resource determined to have the slowest job completion time, by an amount which corresponds to the job partition ratio adjustment value; and
increasing a size of the sub-batch dataset assigned to the accelerator resource determined to have the fastest job completion time, by an amount which corresponds to the pre specified job partition ratio adjustment value.

22. The system of claim 20, wherein performing the iterative batch size tuning process to iteratively adjust the job partition ratio for subsequent mini-batch iterations of the distributed deep learning model training process, further comprises:

for a current mini-batch iteration:

partitioning a current mini-batch dataset into a plurality of sub-batch datasets according to a current job partition ratio;

determining a job completion time for each of the accelerator resources to complete processing of the corresponding one of the sub-batch datasets of the current mini-batch dataset;

determining a standard deviation of the job completion times of the accelerator resources as a result of the current job partition ratio for the current mini-batch iteration;

comparing the determined amount of variation to the variation threshold;

responsive to the determined amount of variation of the job completion times exceeding the variation threshold, adjusting the job partition ratio for partitioning a next mini-batch dataset into a plurality of sub-batch datasets for a next mini-batch iteration of the distributed deep learning model training process;

responsive to the determined amount of variation of the job completion times not exceeding the variation threshold, maintaining the current job partition ratio for partitioning remaining mini-batch datasets into a plurality of sub-batch datasets for remaining mini-batch iterations of the distributed deep learning model training process; and responsive to the determined amount of variation of the job completion times for the current mini-batch iteration exceeding the variation threshold, determining whether an iteration threshold has been reached; and maintaining the current job partition ratio for partitioning remaining mini-batch datasets into a plurality of sub-batch datasets for remaining mini-batch iterations of the distributed deep learning model training process, in response to determining that the iteration threshold has been reached.

23. The system of claim 20, wherein the amount of variation is determined based at least in part on a standard deviation of the job completion times.

* * * * *